United States Patent Office 3,658,864
Patented Apr. 25, 1972

3,658,864
SILOXANE-MODIFIED CARBAMIC ACID DERIVATIVES
Hans Dietrich Golitz, Cologne-Stammheim, and Walter Simmler, Odenthal-Schlinghofen, Germany, assignors to Farbenfabriken Bayer Aktiengesellschaft, Leverkusen, Germany
No Drawing. Filed Jan. 26, 1970, Ser. No. 5,910
Claims priority, application Germany, Feb. 1, 1969,
P 19 05 101.5
Int. Cl. C07f 7/10, 7/18
U.S. Cl. 260—448.2 N          7 Claims

ABSTRACT OF THE DISCLOSURE

New organosiloxane-modified carbamic acid esters comprise at least one structural unit of the formula

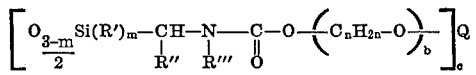

and optionally further structural units of the formula

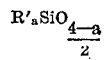

wherein however at least one of every thousand structural units corresponds to the first of the above formulae.

In these formulae R' and R''' are monovalent hydrocarbon radicals of up to 10 carbon atoms, R'' is a hydrogen atom, a methyl radical or a phenyl radical. Q is a monovalent to hexavalent hydrocarbon radical having up to 6 carbon atoms, $m$ is 0, 1 or 2, $n$ is 2, 3 or 4, $a$ is 0, 1, 2 or 3, $b$ is zero or an integer from 1 to 200, and $c$ is the valency number of Q.

These carbamic acid derivatives are prepared either by hydrolyzing a corresponding alkoxysilyl-substituted carbamic acid ester, optionally in admixture with hydrocarbon-substituted alkoxysilanes, or by reacting a corresponding aminomethyl-substituted polysiloxane with a chloroformic acid ester of the formula

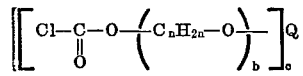

in the presence of a tertiary amine.

The products are to be used as priming agents imparting adhesion to synthetic resins on siliceous surfaces, as surfactants and as intermediates for organo-polysiloxane resins.

---

The present invention relates to new carbo-functional organosiloxane compounds and to processes for their production.

These compounds can be regarded as carbamic acid esters and, in particular, as siloxane-modified carbamic acid derivatives which comprise at least one structural unit of the general formula

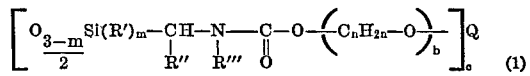 (1)

and optionally further structural units of the general formula

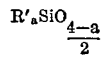

in which compounds, however, at least one of every thousand structural units corresponds to the general Formula 1.

In these formulae, and also in any subsequent formulae, R' is an optionally halogen-substituted or cyano-substituted alkyl, cycloalkyl or aryl radical having up to 10 carbon atoms, R'' is a hydrogen atom or a methyl or phenyl radical, R''' is an alkyl, cycloalkyl, alkenyl, aralkyl, dialkylaminoalkyl, aryl or alkaryl radical having up to 10 carbon atoms, Q is a monovalent to hexavalent saturated aliphatic hydrocarbon radical having up to 6 carbon atoms, $m$ is 0, 1 or 2,
$n$ is 2, 3 or 4,
$a$ is 0, 1, 2 or 3,
$b$ is zero or an integer from 1 to 200, and
$c$ is the valency number of Q, with these radicals and numbers being chosen independently of one another at any point of a molecule.

These compounds are suitable for use as adhesion-promoting intermediate layers on siliceous surfaces which are to be coated with plastics, for example polyurethanes, and also as surface (interface)-active agents and as intermediates for the manufacture of organopolysiloxane resins.

The present invention also provides a process for the production of these compounds, in which a silyl-substituted carbamic acid derivative of the general formula

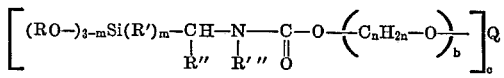

in which, as also in the subsequent formulae, R is an alkyl or cycloalkyl radical having up to 6 carbon atoms or a phenyl radical, or a mixture of such derivatives, or a mixture of these derivatives with compounds of the general formula

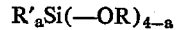

is reacted, at a temperature between 20° and 100° C., with at least half a mol of water per gram equivalent of the RO— radicals.

In an alternative method for the production of these new compounds, an aminomethyl-substituted polysiloxane which consists of at least one structural unit of the general formula

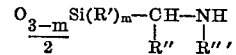

and further structural units, each of which can individually correspond either also to this formula or, up to a total of less than a thousand times the number of units of this formula, to the general formula

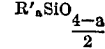

is reacted with a chloroformic acid ester of the general formula

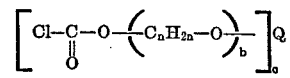

in the presence of a tertiary amine at a temperature of between 20° and 150° C., optionally in the presence of an inert solvent.

For the former hydrolytic reaction recited above, it is advantageous to use aqueous hydrochloric acid containing 0.5 to 10 percent by weight of HCl, in place of pure water in order to accelerate the reaction, and to use two to five times the minimum amount thereof. Acids of low volatility can also be used, but have to be neutralized with sodium hydroxide or triethylamine before isolating the reaction product. The hydrolysis can also be carried out in the presence of a solvent as is sometimes usual for such hydrolytic reactions, such as ethanol, toluene or tetrahydrofuran. After completion of the reaction and, if required, neutralization, the product is freed from the volatile components of the reaction mixture by heating under reduced pressure, and from the salt which may have precipitated, by filtration or by centrifuging.

The silyl-substituted carbamic acid derivatives which are to be subjected to the hydrolysis are obtained, according to a process described in our copending patent application Ser. No. 881,622 filed Dec. 2, 1969, by reacting an aminomethylsilane derivative of the general formula $$(RO-)_{3-m}Si(R')_m-\underset{R''}{\underset{|}{C}}H-\underset{R'''}{\underset{|}{N}}H$$

with a chloroformic acid ester of the general formula $$\left[Cl-\underset{O}{\underset{\|}{C}}-O-(C_nH_{2n}-O)_b\right]_cQ$$

in the presence of a tertiary amine at a temperature of between 20° and 150° C., optionally in the presence of an inert solvent.

Preferably, a temperature between 50° and 120° C. should be chosen for this reaction. The tertiary amine, for example triethylamine or pyridine, serves to bind the acid. Toluene or cyclohexane can for example be used as the inert solvent.

For the alternative process for the production of the compounds according to the present invention, aminomethyl-substituted polysiloxanes are used, such as are obtainable according to known methods, for example by hydrolysis and condensation of corresponding alkoxysilanes of the general formula $$(RO-)_{3-m}Si(R')_m-\underset{R''}{\underset{|}{C}}H-\underset{R'''}{\underset{|}{N}}H$$

or of mixtures of these alkoxysilanes and of those of the general formula $$R'_aSi(-OR)_{4-a}$$

In cases where, per hundred structural units of the process product 70 or more are to be units of the general formula $$R'_aSiO_{\frac{4-a}{2}}$$

a further method which is advisable is that in which halogenomethyl-substituted polysiloxanes consisting of structural units of the general formulae $$O_{\frac{3-m}{2}}Si(R')_m-\underset{R''}{\underset{|}{C}}H-(Cl \text{ or } Br) \quad \text{and} \quad R'_aSiO_{\frac{4-a}{2}}$$

are reacted with ammonia or primary amines of formula $R'''NH_2$ to give the corresponding aminomethyl-substituted polysiloxanes. It is known that the above mentioned aminomethylsilane derivatives of the general formula $$(RO-)_{3-m}Si(R')_m-\underset{R''}{\underset{|}{C}}H-\underset{R'''}{\underset{|}{N}}H$$

are also obtained in an analogous manner. In all these cases it is advantageous to use amines which boil above 50° C., for example cyclohexylamine, and in particular in such amounts that they function as well as a reaction component for the product to be obtained, as also as an acid-binding agent and as a diluent. The reaction is then allowed to take place at a temperature of between 50° and 120° C. and after filtering off the ammonium halide which has precipitated and removing the excess amine from the filtrate by distillation, the aminomethylsilicon compounds are obtained as a residue.

The chloroformic acid esters used as reactants as described above are obtained according to known processes by reaction of phosgene with hydroxyl compounds of the general formula $$\left[HO-(C_nH_{2n}-O)_b\right]_cQ$$

The invention is illustrated in and by the following examples.

EXAMPLE 1

50 g. (0.158 mol) N-cyclohexyl-N-(methyldiethoxysilylmethyl)-urethane of the formula $$(C_2H_5O-)_2Si(CH_3)-CH_2-\underset{\underset{C_6H_{11}}{|}}{N}-\underset{O}{\underset{\|}{C}}-O-C_2H_5$$

are mixed with 3.75 g. (0.032 mol) trimethylethoxysilane, 40 cm.³ ethanol and 18 cm.³ aqueous hydrochloric acid containing 0.5 percent by weight HCl. For the hydrolysis, the mixture is heated to the boil for 4 hours under reflux and easily volatile constituents are then removed therefrom by reducing the pressure to 12 mm. Hg and heating to 100° C. The clear yellow residue which barely flows at room temperature is the reaction product of the formula $$(CH_3)_3Si-O-\left[\underset{\underset{\underset{C_6H_{11}}{|}}{N-C-O-C_2H_5}}{\underset{|}{Si(CH_3)}}-O\right]_{10}-Si(CH_3)_3$$

The silyl-substituted urethane used in this example and the next example can be manufactured as follows:

227 g. (1 mol) methyl-(bromomethyl)-diethoxysilane are gradually added, with stirring, to 323 g. (3.2 mols) cyclohexylamine, in the course of which the temperature rises to about 65° C. Thereafter the reaction mixture is heated for a further 2 hours to 100° C. and the precipitated amine salt is filtered off after cooling. Fractional distillation of the filtrate yields, at 1.5 mm. Hg between 105° and 110° C., the N-cyclohexyl-(aminomethyl)-methyldiethoxysilane $$(C_2H_5O-)_2Si(CH_3)-CH_2-NH-C_6H_{11}$$

having a refractive index $n_D^{20}=1.4460$. 98 g. (0.4 mol) thereof and 44 g. (0.44 mol) triethylamine are dissolved in 250 cm.³ toluene and 45.8 g. (0.42 mol) chloroformic acid ethyl ester are added thereto over the course of 15 minutes. Thereafter the reaction mixture is heated to the boil under reflux for one hour and the triethylammonium chloride which has precipitated is filtered off after cooling. Distillation of the filtrate through a column yields, at 0.1 mm. Hg and between 96° and 100° C., the ester to be used according to Examples 1 and 2, having a refractive index $n_D^{20}=1.4562$.

EXAMPLE 2

46 g. (0.145 mol) N-cyclohexyl-N-(methyldiethoxysilylmethyl)-urethane are mixed with 21.5 g. (0.145 mol) dimethyldiethoxysilane, 3.5 g. (0.029 mol) trimethylethoxysilane and 33 cm.³ normal aqueous hydrochloric acid, and the mixture is heated for 4 hours to 80° C. Thereafter 75 cm.³ of cyclohexane are added, the aqueous phase is separated off, and the siloxane solution is freed of the volatile constituents at 15 mm. Hg. and at most 100° C. A clear yellowish oil is left, having a composition corresponding to the formula $$(CH_3)_3Si-O-\left[\left(\underset{\underset{\underset{C_6H_{11}}{|}}{N-C-O-C_2H_5}}{\underset{|}{Si(CH_3)}}-O-\right)(-Si(CH_3)_2-O-)_{10}\right]_{10}-Si(CH_3)_3$$

EXAMPLE 3

11 g. (0.11 mol) triethylamine and 61.6 g. (0.1 gram equivalent) methyl-(isobutylaminomethyl)-polysiloxane of the formula

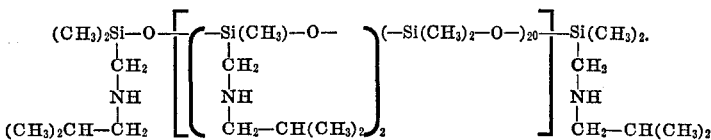

are dissolved in 100 cm.³ anhydrous toluene. 174 g. (0.1 mol) chloroformic acid polyglycol ester of the formula

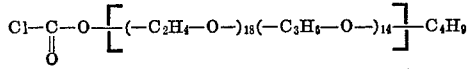

are added to this solution, after which the temperature of this reaction mixture rises to 48° C. Thereafter the mixture is heated for one hour at 100° C., the ammonium salt which has precipitated is filtered off, and the filtrate is freed of volatile constituents at 0.5 mm. Hg and at most 100° C. The reaction product remains as a clear light brown oil which is soluble in water and of which the composition essentially corresponds to the formula

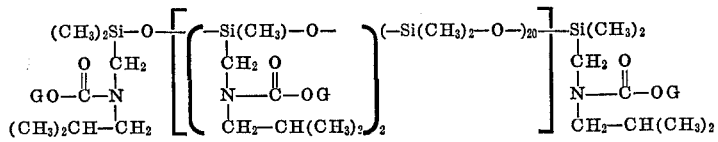

wherein —OG denotes the radical

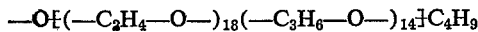

The isobutylaminomethyl-substituted polysiloxane to be used for this reaction can be manufactured as follows:

A mixture of 3870 g. (30 mols) dimethyldichlorosilane, 624 g. (3 mols) methyl-(bromomethyl)-dichlorosilane and 562 g. (3 mols) dimethyl-(bromomethyl)-chlorosilane is allowed to run gradually into 10 litres of water. After complete hydrolysis the oil phase is separated off and dried; 3 percent by weight of hydrogen-montmorillonite are added thereto and the mixture is heated for 5 hours to 150° C. in order to equilibrate the polysiloxane; the mixture is then filtered. The filtrate obtained is a methyl-(bromomethyl)-polysiloxane containing 15 percent by weight of Br, the composition of which on average corresponds to the formula

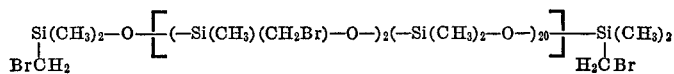

1940 g. thereof are mixed with 2060 g. (29 mols) isobutylamine and the mixture is gradually heated to the boil under reflux, which is continued for 3 hours. After cooling of the reaction mixture the isobutylammonium bromide which has precipitated therein is filtered off and the filtrate is freed of volatile constituents by lowering the pressure to 0.5 mm. Hg and heating to 130° C. After again filtering, a filtrate of 50 cp. viscosity at 20° C. is obtained, containing 2.27 percent by weight of nitrogen in secondary amino groups and 0.24 percent by weight of nitrogen in tertiary amino groups, which is to be reacted with the chloroformic acid polyglycol ester in accordance with the example described above.

The ester can be manufactured as follows:

64 g. of phosgene are introduced, whilst stirring, into 700 g. of a polyoxyethylene-oxypropylene-mono-n-butyl ether of which the composition on average corresponds to the formula

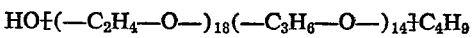

with the phosgene dissolving whilst the temperature rises to 35° C. Thereafter the reaction mixture is heated for 2 hours to 80° C. and freed of excess phosgene at this temperature by reducing the pressure to 12–14 mm. Hg. This treatment is stopped when the chlorine content of the reaction mixture, determined by repeated titration, no longer falls. The residual light brown oil on average has the composition of a chloroformic acid polyglycol ester of the formula given in the example.

EXAMPLE 4

137 g. (1.37 mols) triethylamine and 791 g. (1.25 gram equivalents) methyl-(cyclohexylaminomethyl)-polysiloxane of the formula

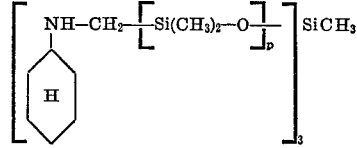

wherein the number 3p of the difunctional siloxane units per molecule is on average 19, are dissolved in 2 litres anhydrous toluene. 2350 g. (1.375 mols) of the chloroformic acid polyglycol ester described in Example 3 are added to this solution over the course of 25 minutes, during which time the temperature of the reaction mixture rises to 50° C. The mixture is then heated for one hour to 100° C., the salt which has precipitated is filtered off after cooling and the filtrate is freed of easily volatile constituents by reducing the pressure to 0.5 mm. Hg and heating to 100° C. A clear water-soluble honey-yellow oil of viscosity 1170 cp. at 20° C. remains, the composition of which approximately corresponds to the formula

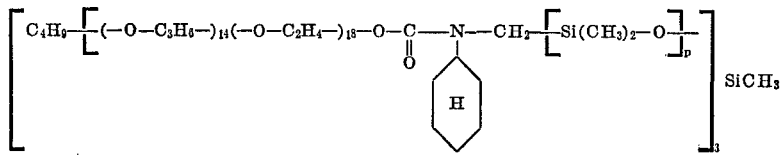

The cyclohexylaminomethyl-substituted polysiloxane to be used for this reaction can be manufactured as follows:

A mixture of 244 g. (1.5 mols) methyltrichlorosilane, 3095 g. (24 mols) dimethyldichlorosilane and 844 g. (4.5 mols) dimethyl-(bromomethyl)-chlorosilane is allowed to hydrolyze by gradually running it into 5 litres of water, and the polysiloxane phase hereby formed is subsequently separated off, dried and then mixed with 3 perecnt by weight of hydrogen-montmorillonite (which acts as an equilibration catalyst). This mixture is heated to 150° C. for 5 hours to equilibrate it and is filtered after cooling. The filtrate contains 12.5 percent by weight of bromine in BrCH$_2$- groups. 2320 g. thereof are mixed with 2420 g. (24.4 mols) cyclohexylamine and the mixture is heated for one hour to 100° C. whilst stirring. The salt which precipitates in the course thereof is filtered off after cooling, and the filtrate is freed of easily volatile constituents at 0.5 mm. Hg and at most 130° C. and is again filtered. The filtrate has a viscosity of 45 cp. at 20° C. and in addition to 0.07 percent by weight of nitrogen in tertiary amino groups contains 2.21 percent by weight of nitrogen in secondary cyclohexylaminomethyl groups. Its composition is substantially that of the formula given at the beginning of the example.

EXAMPLE 5

2225 g. (1.87 gram equivalents) of a chloroformic acid polyglycol ester of the formula

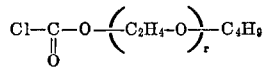

containing 2.95 percent by weight of chlorine, corresponding to an equivalent weight of 1202 g. that is to say a numerical value r of about 24, are dissolved in 3 litres of toluene. A mixture of 208 g. (2.06 mols) triethylamine and 1090 g. (1.87 gram equivalents) of a methyl - (cyclohexylaminomethyl - polysiloxane of the formula

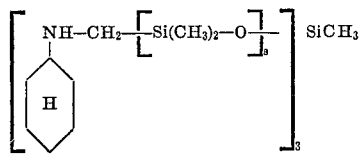

with 3s on average equalling 17, is added dropwise to this solution. Thereafter the reaction mixture is heated to the boil under reflux for 2 hours, the triethylammonium chloride which has precipitated is filtered off at room temperature, and the filtrate is freed of solvent initially at 12 mm. Hg and 100° C. and subsequently at 0.5 mm. Hg and 130° C. The residual polysiloxane-modified polyether-carbamate solidifies at room temperature, melts at about 25° C. and has a viscosity of 520 cp. at 30° C. It gives a clear solution in water, and its composition corresponds approximately to the formula

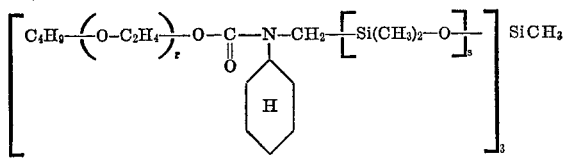

The cyclohexylaminomethyl - substituted polysiloxane to be used for this example can be manufactured by first reacting a mixture of 132 g. (0.89 mol) methyltrichlorosilane, 1600 g. (12.4 mols) dimethyldichlorosilane and 498 g. (2.66 mols) dimethyl - (bromomethyl)-chlorosilane hydrolytically, analogously to the description given in Example 4, to give a polysiloxane of the formula

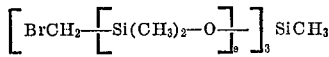

containing 15 percent by weight of Br. 1250 g. thereof are then allowed to run dropwise into 1400 g. cyclohexylamine heated to 100° C., and the mixture is kept at 100° C. for a further hour and filtered after cooling. The easily volatile constituents are first removed from the filtrate by heating to 100° C. at 14 mm. Hg and thereafter by two treatments in a thin layer evaporator at 0.5 mm. Hg and 130° C. The residue is filered once more and a light yellow oil of viscosity 42 cp. at 20° C. is obtained as the filtrate, which in addition to 0.08 percent by weight of nitrogen in tertiary amino groups contains 2.4 percent by weight of nitrogen in its secondary cyclohexylaminomethyl groups and which is now to be reacted, as described above, with the chloroformic acid ester of a polyethylene glycol monobutyl ether.

This ester can be manufactured by reacting a polyether obtained by ethoxylation of n-butanol, containing 1.63 percent by weight of HO, corresponding to a molecular weight of 1043, with phosgene analogously to the process indicated as an appendix to Example 3.

EXAMPLE 6

71 g. (0.7 mol) triethylamine and 598 g. (0.5 gram equivalent) of a methyl-(cyclohexylaminomethyl)-polysiloxane of the formula

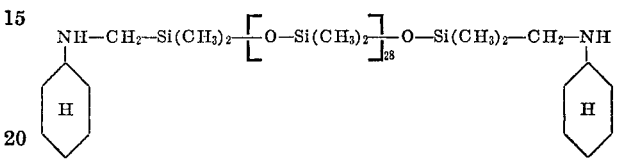

are dissolved in 1.5 litres anhydrous toluene. 138 g. (0.5 gram equivalent) octaethylene glycol-bis-chloroformic acid ester containing 12.9 percent by weight of chlorine are added to this solution, in the course of which the temperature of the reaction mixture rises to 45° C. The mixture is heated to the boil under reflux for 2 hours, the triethylammonium chloride which has precipitated is filtered off at room temperature and the filtrate is freed of the solvent by heating to 80° C., first at 14 mm. Hg and subsequently at 0.5 mm. Hg. The reaction product which remains is a clear light yellow oil of 3650 cp. viscosity at 20° C., consisting of polymer segments of the formula

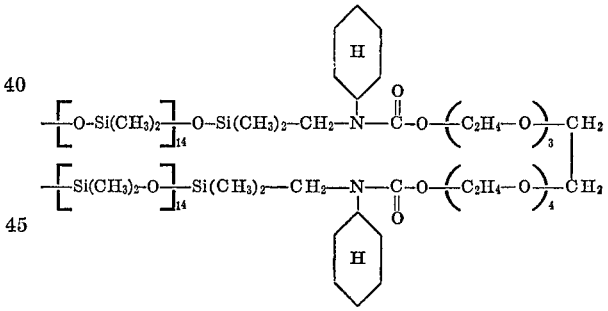

The cyclohexylaminomethyl-substituted polysiloxane to be used in this example can be manufactured by first heating a mixture of 866 g. (2.92 mols) octamethylcyclotetrasiloxane, 133.5 g. (0.417 mol) 1,3 - di-(bromomethyl)-tetramethyldisiloxane and 30 g. hydrogen-montmorillonite for 5 hours at 150° C. for equilibrating redistribution of the siloxane units, and filtering the polysiloxane thus obtained, containing 6.5 percent by weight of H$_2$C— bonded bromine and having an average composition of the formula

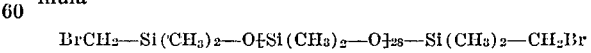

after it has cooled. 934 g. of the filtrate are then allowed to run dropwise into 500 g. of cyclohexylamine heated to 80° C., and the mixture is heated to 100° C. for one hour whilst stirring and is filtered after having cooled to room temperature. The filtrate is freed of easily volatile constituents by heating to 185° C. at 14 mm. Hg and is thereafter again filtered. The filtrate is a yellow oil of viscosity 43 cp. at 20° C., which in addition to 0.05 percent by weight of tertiary-bonded nitrogen contains 1.17 percent by weight of nitrogen in its secondary cyclohexylaminomethyl groups, and the composition of which essentially corresponds to the formula given at the beginning of the example.

What we claim is:

1. Nonresinous siloxane-modified carbamic acid deriva-tives consisting of at least one structural unit of the general formula

and further structural units each of which is individually selected from the group consisting of units corresponding to the above formula and, up to a total of less than a thousand times the number of units of said formula, of units corresponding to the general formula $$R'_aSiO_{\frac{4-a}{2}}$$

in which formulae

R' is a radical having up to 10 carbon atoms, selected from the group consisting of alkyl, cycloalkyl, aryl, halogenated alkyl, cycloalkyl and aryl, and cyano-substituted alkyl, cycloalkyl and aryl, R'' is selected from the group consisting of a hydrogen atom, a methyl radical and a phenyl radical, R''' is a radical having up to 10 carbon atoms, selected from the group consisting of alkyl, cycloalkyl, alkenyl, aralkyl, dialkylaminoalkyl, aryl and alkaryl, Q is a monovalent to hexavalent saturated aliphatic hydrocarbon radical having up to 6 carbon atoms, m is selected from 0, 1 and 2, n is selected from 2, 3 and 4, a is selected from 0, 1, 2 and 3, b is selected from 0 and the integers from 1 to 200, c is the valency number of Q, the above defined radicals and numbers being selected independently of one another at any point of a molecule.

2. A compound according to claim 1, having the formula

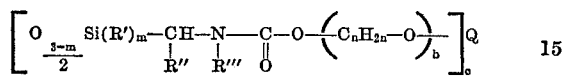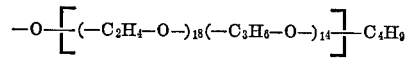

3. A compound according to claim 1, having the formula

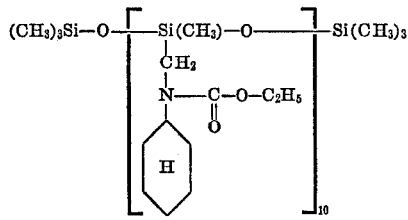

4. A compound according to claim 1, having the formula

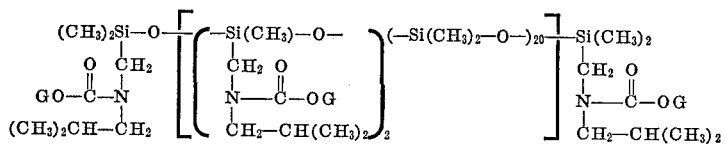

wherein —OG denotes the radical

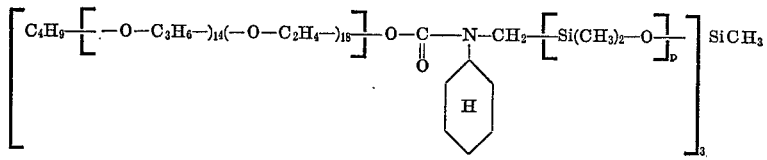

5. A compound acording to claim 1, having the formula

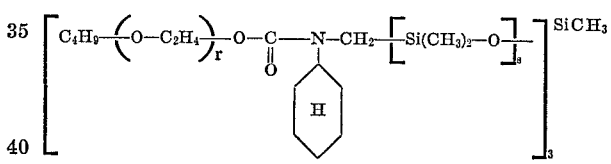

wherein the number 3p of the difunctional siloxane units per molecule is on average 19.

6. A compound according to claim 1, having the formula

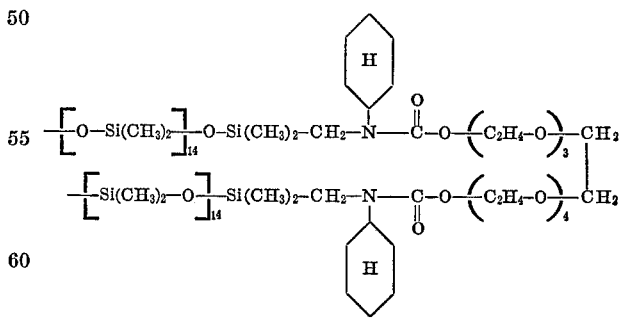

wherein the numerical value r is about 24, and the number 3s of the difunctional siloxane units per molecule is on average 17.

7. A compound according to claim 1, consisting of polymer segments of the formula

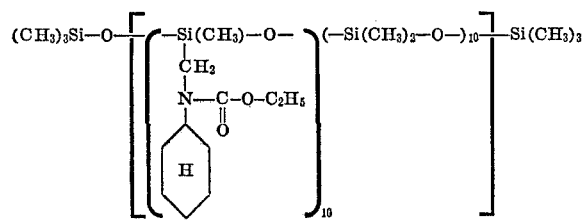

References Cited

UNITED STATES PATENTS 2,973,383  2/1961  Black _____ 260—448.2 N
2,928,858  3/1960  Morehouse _____ 260—448.8 R TOBIAS E. LEVOW, Primary Examiner
P. F. SHAVER, Assistant Examiner U.S. Cl. X.R.

117—123 C, 123 D; 252—357, DIG. 1; 260—46.5 E, 46.5 G, 46.5 Y, 448.8 R

UNITED STATES PATENT OFFICE
CERTIFICATE OF CORRECTION

Patent No. 3,658,864            Dated April 25, 1972

Inventor(s) Hans Dietrich Golitz et al

It is certified that error appears in the above-identified patent and that said Letters Patent are hereby corrected as shown below:

Col. 4, line 67

"$(CH_3)$" should be -- $(CH_3)_3$ --.

Signed and sealed this 1st day of May 1973.

(SEAL)
Attest:

EDWARD M. FLETCHER, JR.            ROBERT GOTTSCHALK
Attesting Officer                    Commissioner of Patents